United States Patent
Choi et al.

(10) Patent No.: US 7,517,129 B2
(45) Date of Patent: Apr. 14, 2009

(54) LIGHT GUIDE PLATE, BACKLIGHT ASSEMBLY HAVING THE SAME, DISPLAY APPARATUS HAVING THE SAME AND METHOD OF MANUFACTURING THE SAME

(75) Inventors: Jin-Sung Choi, Yongin-si (KR); Jheen-Hyeok Park, Seongnam-si (KR); Byung-Yun Joo, Goyang-si (KR); Ju-Hwa Ha, Seoul (KR); Jung-Wook Paek, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 94 days.

(21) Appl. No.: 11/403,131

(22) Filed: Apr. 12, 2006

(65) Prior Publication Data
US 2006/0245061 A1 Nov. 2, 2006

(30) Foreign Application Priority Data
Apr. 15, 2005 (KR) .................. 10-2005-0031549

(51) Int. Cl.
*F21V 7/04* (2006.01)
*G02B 6/10* (2006.01)
(52) U.S. Cl. .............. 362/617; 362/332; 362/619; 385/131
(58) Field of Classification Search .......... 362/293, 362/616, 617, 618, 619, 627, 629, 206, 207, 362/332; 385/129, 146, 147, 901, 130, 131
See application file for complete search history.

(56) References Cited

U.S. PATENT DOCUMENTS

| | | | | |
|---|---|---|---|---|
| 5,808,709 A | * | 9/1998 | Davis et al. | 349/65 |
| 5,845,035 A | * | 12/1998 | Wimberger-Friedl | 385/129 |
| 5,856,855 A | * | 1/1999 | Mol et al. | 349/65 |
| 5,949,943 A | * | 9/1999 | Watanabe et al. | 385/129 |
| 6,025,897 A | * | 2/2000 | Weber et al. | 349/96 |
| 6,101,032 A | * | 8/2000 | Wortman et al. | 359/500 |
| 6,329,968 B1 | * | 12/2001 | Cornelissen et al. | 345/87 |
| 6,352,350 B1 | * | 3/2002 | Ma | 362/19 |
| 2001/0024561 A1 | * | 9/2001 | Cornelissen et al. | 385/146 |
| 2002/0172031 A1 | * | 11/2002 | Masuda | 362/31 |
| 2002/0181111 A1 | * | 12/2002 | Okabe et al. | 359/599 |
| 2003/0058383 A1 | * | 3/2003 | Jagt et al. | 349/65 |
| 2003/0058386 A1 | * | 3/2003 | Bastiaansen et al. | 349/100 |
| 2004/0028370 A1 | * | 2/2004 | Bourdelais et al. | 385/145 |
| 2005/0024890 A1 | * | 2/2005 | Yamamoto et al. | 362/555 |

* cited by examiner

*Primary Examiner*—John A Ward
(74) *Attorney, Agent, or Firm*—Cantor Colburn LLP

(57) ABSTRACT

A light guide plate includes a first optical member having a first light path-changing portion to separate a first light portion and a second light portion from a light, and a second optical member having a second light path-changing portion corresponding to the first light path-changing portion. The first optical member has a first refractive index against the first light portion of the light and a second refractive index against the second light portion of the light, and the second optical member has the first refractive index against the first and second light portions. Thus, brightness and brightness uniformity of an image displayed on a display apparatus may be improved, and a number of parts of the display apparatus may be reduced.

41 Claims, 16 Drawing Sheets

LIGHT GUIDE PLATE, BACKLIGHT ASSEMBLY HAVING THE SAME, DISPLAY APPARATUS HAVING THE SAME AND METHOD OF MANUFACTURING THE SAME

This application claims priority to Korean Patent Application No. 2005-31549, filed on Apr. 15, 2005 and all the benefits accruing therefrom under 35 U.S.C. §119, and the contents of which in its entirety are herein incorporated by reference.

BACKGROUND OF THE INVENTION

1. Field of the Invention

The present invention relates to a light guide plate, a backlight assembly having the same, a display apparatus having the same, and a method of manufacturing the same. More particularly, the present invention relates to a light guide plate having improved brightness and reduced size, a backlight assembly having the light guide plate, a display apparatus having the backlight assembly, and a method of manufacturing the light guide plate.

2. Description of the Related Art

In general, a display apparatus, such as a cathode ray tube ("CRT") display apparatus, a liquid crystal display ("LCD") apparatus, a plasma display panel, and an organic light emitting diode ("OLED") display, converts data processed in an information-processing device and displays an image using the converted data.

The LCD apparatus displays the image using electrical and optical properties of liquid crystal. The LCD apparatus requires a light source because its display panel is not self-emissive. Further, the LCD apparatus requires an optical member to improve brightness uniformity of a light emitted from the light source. The optical member includes various members such as a light guide plate that improves the brightness uniformity of the light, a reflecting plate that reflects the light leaked from the light guide plate and optical sheets that enhance the brightness of the light from the light guide plate. The optical sheets include a brightness enhancing film that enhances the brightness and a prism sheet that condenses the light.

However, since the optical sheets are disposed on the light guide plate, a volume of the LCD apparatus increases, an assembly time for the LCD apparatus is lengthened, and a manufacturing cost of the LCD apparatus increases.

BRIEF SUMMARY OF THE INVENTION

The present invention provides a light guide plate having improved brightness and reduced size.

The present invention also provides a method suitable for manufacturing the above light guide plate.

The present invention also provides a backlight assembly having the above light guide plate.

The present invention also provides a display apparatus having the above backlight assembly.

In an exemplary embodiment of the present invention, a light guide plate includes a first optical member and a second optical member. The first optical member has a first refractive index against a first light portion of a light and a second refractive index against a second light portion of the light, and a second optical member on the first optical member has the first refractive index against the first and second light portions of the light.

In another embodiment of the present invention, a method of manufacturing a light guide plate is provided as follows. A first optical member having a first refractive index against a first light portion of a light and a second refractive index against a second light portion of the light is formed. A second optical member having the first refractive index against the first and second light portions of the light is formed on the first optical member.

In still another embodiment of the present invention, a backlight assembly includes a light source that emits a light having a first light portion and a second light portion, a light guide plate, and a light converting member.

The light guide plate of the backlight assembly includes a first optical member having a first light path-changing portion to separate the first and second light portions of the light and a second optical member having a second light path-changing portion corresponding to the first light path-changing portion. The first optical member has a first refractive index against the first light portion of the light and a second refractive index against the second light portion of the light, and the second optical member on the first optical member has the first refractive index against the first and second light portions of the light. The light converting member converts the second light portion of the light from the light guide plate into the first light portion.

In still another embodiment of the present invention, a display apparatus includes a light source that emits a light having a first light portion and a second light portion, a light guide plate, a light converting member, and a display panel.

The light guide plate includes a first optical member having a first light path-changing portion to separate the first and second light portions of the light and a second optical member having a second light path-changing portion corresponding to the first light path-changing portion. The first optical member has a first refractive index against the first light portion of the light and a second refractive index against the second light portion of the light, and the second optical member on the first optical member has the first refractive index against the first and second light portions of the light. The light converting member converts the second light portion of the light from the light guide plate into the first light portion. The light converting member reflects the second light portion to convert the second light portion into the first light portion. The display panel displays an image using the first light portion of the light.

According to the above embodiments, the light leaking from the light guide plate is reflected toward the display panel, so that an amount of the light applied to the display panel from the light guide plate may be augmented. Brightness and brightness uniformity of an image displayed on a display panel incorporating the light guide plate may be improved, and a number of parts of the display apparatus may be reduced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
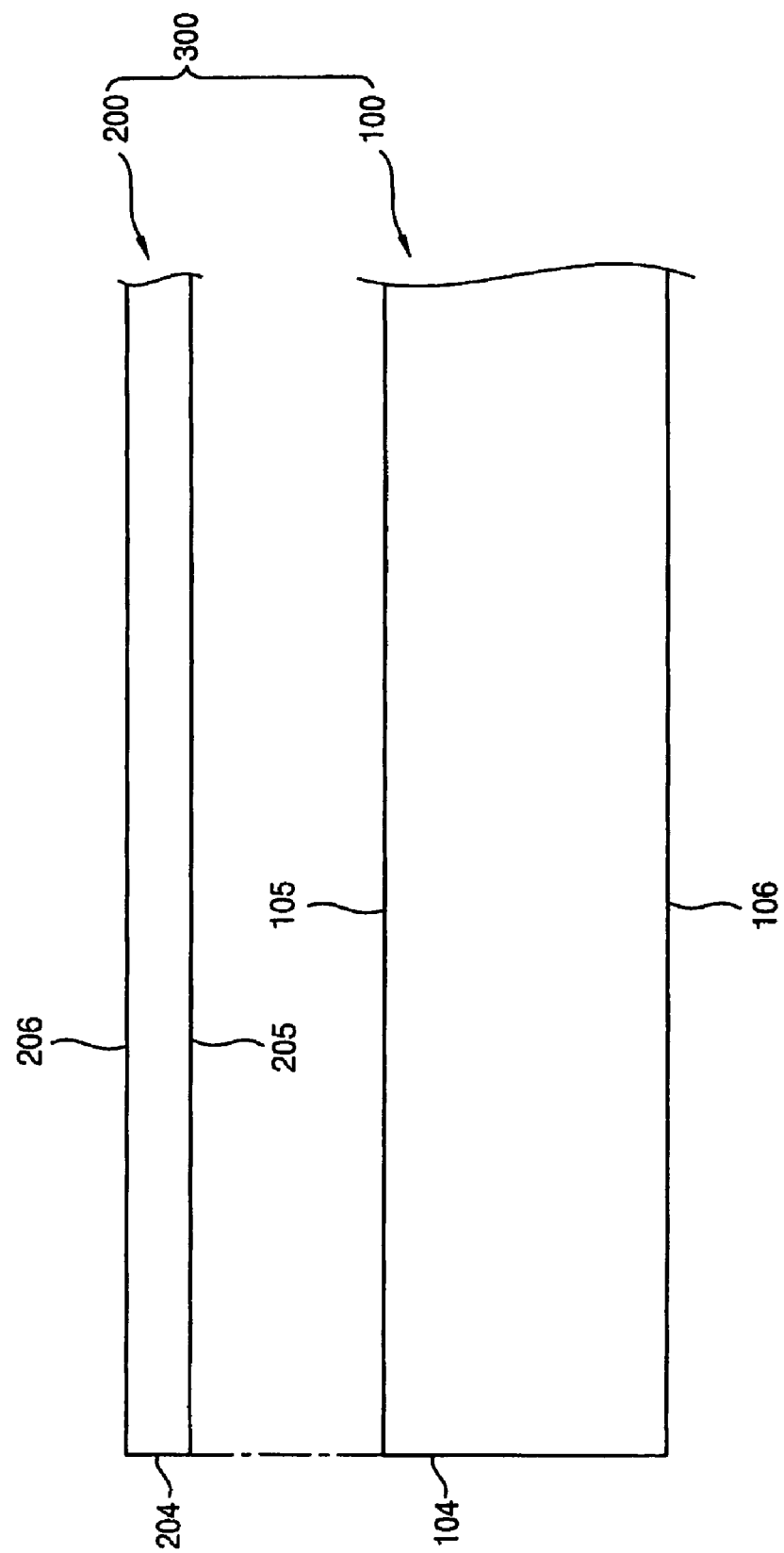
FIG. 1 is an exploded cross-sectional view showing an exemplary embodiment of a light guide plate according to the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
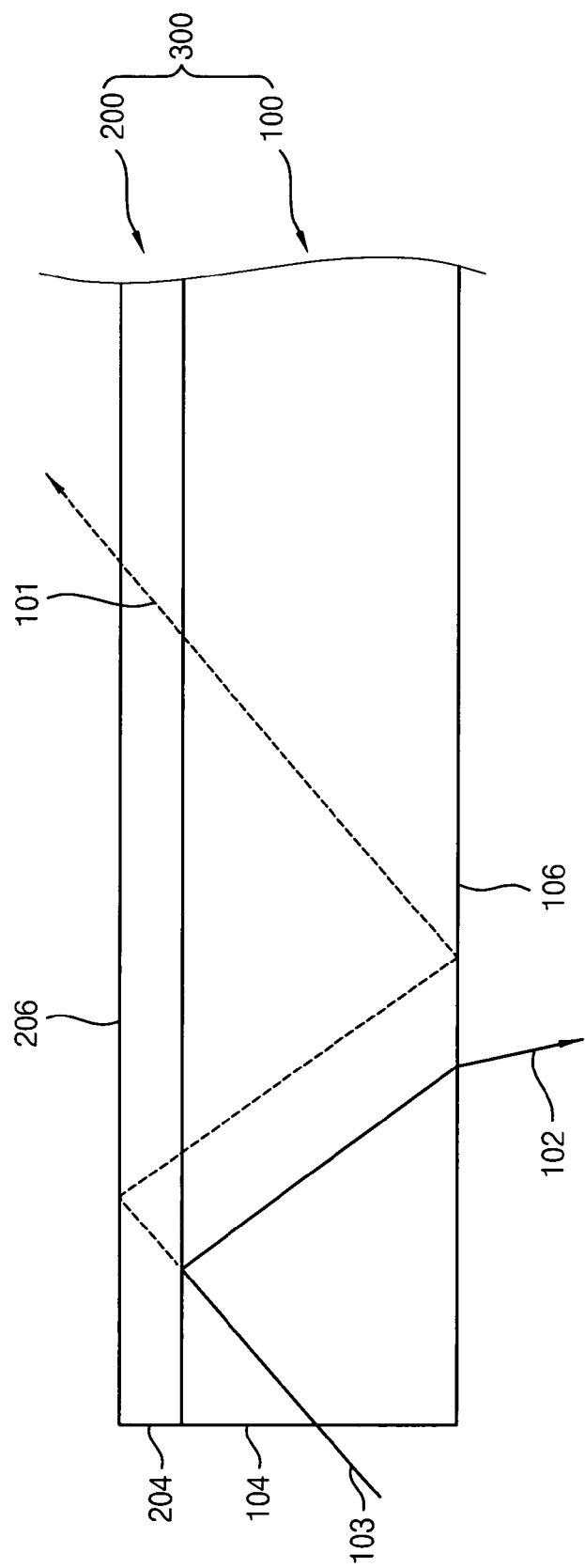
FIG. 2 is a cross-sectional view showing an exemplary first optical member assembled with an exemplary second optical member in FIG. 1.

FIG. 1 is an exploded cross-sectional view showing an exemplary embodiment of a light guide plate according to the present invention. FIG. 2 is a cross-sectional view showing an exemplary first optical member assembled with an exemplary second optical member in FIG. 1.

Referring to FIGS. 1 and 2, a light guide plate 300 includes a first optical member 100 and a second optical member 200.

The first optical member 100 has a substantially rectangular plate-like shape, although other shapes would be within the scope of these embodiments. The first optical member 100 includes four side faces 104, a first surface 105, and a second surface 106 facing the first surface 105. In the illustrated embodiment, the first surface 105 is substantially parallel to the second surface 106. An example of the first optical member 100 may include a polyethylene naphthalate resin, although other materials with similar properties would also be within the scope of these embodiments. The first optical member 100 has an expansion ratio from about 200% to about 700% with respect to an initial length before the first optical member 100 is extended.

When the first optical member 100 is extended, a first light portion 101 of a light 103 incident into the first optical member 100, such as through a side face 104 in an edge-type illumination backlight assembly, is refracted at a first refractive index at a boundary between the first optical member 100 and an air, and a second light portion 102 of the light 103 is refracted at a second refractive index at a boundary between the first optical member 100 and the air, where the boundary between the first optical member 100 and the air may be the first surface 105. The first refractive index and the second refractive index may be different. When the first optical member 100 includes the polyethylene naphthalate resin, the first refractive index of the first light portion 101 is about 1.57 against the air, and the second refractive index of the second light portion 102 is about 1.85 against the air.

Other examples of the first optical member 100 may include a polycarbonate-based resin, a polysulfonate-based resin, a polymethylmethacrylate-based resin, a polystyrene-based resin, a polyvinylchloride-based resin, a polyvinylalcohol-based resin, a polynorbornene-based resin, a plolyethylenenaphthalate-based resin, etc.

Referring to FIGS. 1 and 2, the second optical member 200 is disposed on the first surface 105 of the first optical member 100. The second optical member 200 has a substantially rectangular film-like shape, although other shapes complimentary with a shape of the first optical member 100 would be within the scope of these embodiments. The second optical member 200 includes four side faces 204, a third surface 205 facing and overlying the first surface 105 of the first optical member 100, and a fourth surface 206 opposite to the third surface 205. The third surface 205 may be substantially parallel to the fourth surface 206.

The second optical member 200 has the first refractive index, or at least substantially the same first refractive index, with respect to the first and second light portions 101 and 102 of the light 103.

When the first optical member 100 has the first and second refractive indexes with respect to the first and second light portions 101 and 102, respectively, and the second optical member 200 has only the first refractive index with respect to the first and second light portions 101 and 102, the first light portion 101 incident into the first optical member 100 is not refracted or reflected from the boundary between the first and second optical members 100 and 200, where the boundary is defined by the first surface 105 of the first optical member 100 against the third surface 205 of the second optical member 200. On the contrary, the second light portion 102 is refracted or reflected from the boundary between the first and second optical members 100 and 200 due to a difference between the first and second refractive indexes.

Thus, when the third surface 205 of the second optical member 200 is disposed on the first surface 105 of the first optical member 100, the first and second light portions 101 and 102 of the light may be separated from each other.

It should be understood that all materials refract light, that is, alter the angle of light. The measure of a material's refractivity is known as its refractive index. Light travels at different speed through different media. When light passes from one medium to another, its path is altered, bent, and it is said to be diffracted. The higher the refractive index of a substance, the greater the angle that light bends at the surface interface between air and the substance. The refractive index is a constant for a given pair of materials. It can be defined as speed of light in a first material divided by speed of light in a second material. The incident light is in the first material and the refracted light is in the second material. By definition, the refractive index of a vacuum is 1 and therefore the refractive indexes of materials used in the light guide plate of these embodiments is greater than 1.

Also, it should be further understood that the refractive index of a material is not constant for light of different frequencies, that is, colors. Thus, different frequencies, of light are refracted at different angles. The higher its frequency, the slower light travels through a given material. Refractive index increases as the frequency of the light increases.

Referring back to FIG. 2, the second light portion 102 may be converted into the first light portion 101 to improve brightness of the first light portion 101 from the light guide plate 300, such as by reflection of the second light portion 102 by a reflecting plate disposed below or adjacent to the second surface 106 where the second light portion 102 exits the first optical member 100, as will be further described below.

Figure 3:
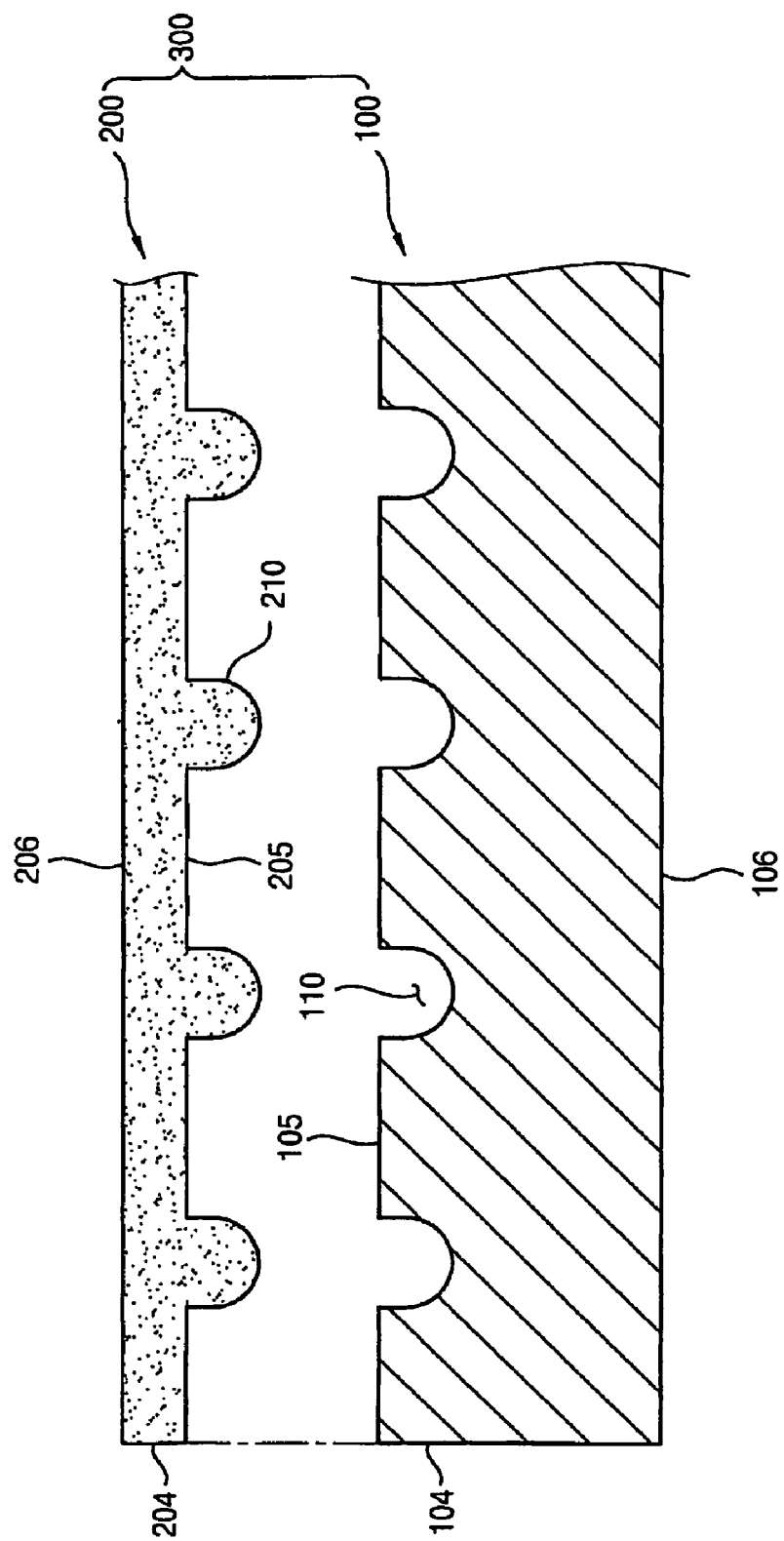
FIG. 3 is an exploded cross-sectional view showing another exemplary embodiment of a light guide plate according to the present invention.
Figure 4:
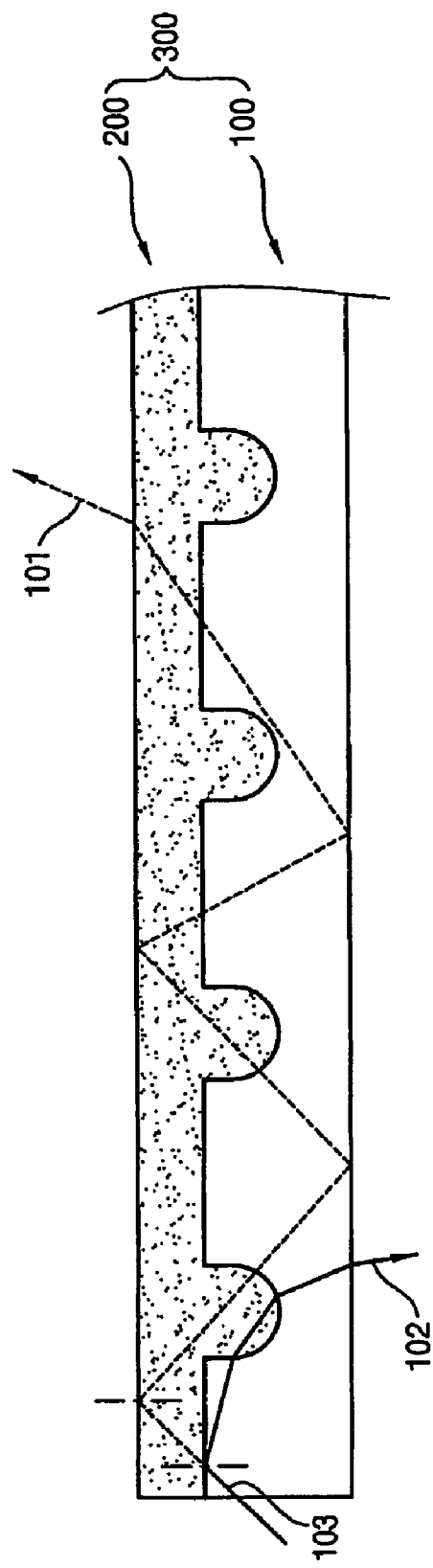
FIG. 4 is a cross-sectional view showing an exemplary first optical member assembled with an exemplary second optical member in FIG. 3.

FIG. 3 is an exploded cross-sectional view showing another exemplary embodiment of a light guide plate according to the present invention. FIG. 4 is a cross-sectional view showing an exemplary first optical member assembled with an exemplary second optical member in FIG. 3. In FIGS. 3 and 4, the light guide plate has a same function and a same structure as the light guide plate in FIGS. 1 and 2 except for the addition of a first light-path changing portion and a second light-path changing portion, and thus any further repetitive descriptions of the light guide plate will be omitted.

Referring to FIGS. 3 and 4, a first optical member 100 of the light guide plate 300 includes a first light path-changing portion 110 and a second optical member 200 includes a second light path-changing portion 210. The first and second light path-changing portions 110, 210 may each include a plurality of portions as shown.

The first light path-changing portion 110 is formed at a first surface 105 of the first optical member 100 facing the second optical member 200. The second light path-changing portion 210 is formed at a third surface 205 of the second optical member 100 facing the first surface 105. Thus, the first surface 105 and the third surface 205 are not planar surfaces as their respective surfaces are interrupted by the first and second light path-changing portions 110, 210.

In the illustrated embodiment, the first light-path changing portion 110 has a recessed shape, and the second light path-changing portion 210 has a projected shape. However, the first light path-changing portion 110 may have various shapes such as, but not limited to, a recess, a projection and the like. Likewise, the second light path-changing portion 210 may have various complimentary shapes such as, but not limited to, a projection, a recess, etc.

In other embodiments, the first light-path changing portion 110 may have various recessed shapes, such as a cone shape, a triangular pyramid shape, a quadrangular pyramid shape, a polypyramid shape, etc. The second light-path changing portion 210 may have the projected shape combined with the first light-path changing portion 110. That is, the first and second light path-changing portions 110, 210 mate such that the first surface 105 including the first light path-changing portion 110 lies flush with the third surface 205 including the second light path-changing portion 210. In other words, one of the first and second light path-changing portions 110, 210 includes a female portion, and the other of the first and second light-path changing portions 110, 210 includes a male portion. On the other hand, the first light-path changing portion 110 may have a groove formed at the first surface 105 thereof. That is, the first light-path changing portion 110 may be allowed to have various cross-sectional views, for example, such as a semicircular shape and a semi-oval shape. In the present embodiment, the first light-path changing portion 110 has a curvature from about 10 angstroms to about 1000 angstroms, preferably, from about 50 angstroms to about 500 angstroms. In one embodiment, the first and second light path-changing portions 110, 210 may extend from a first side face 104, 204 to an opposite second side face 104, 204. That is, the first and second light-path changing portions 110, 210 may extend longitudinally across the surfaces 105, 205. Alternatively, the first and second light path-changing portions 110, 210 may form a dimpled pattern across the surfaces 105, 205. In either embodiment, the first and second light path-changing portions 110, 210 are arranged on the surfaces 105, 205 such that they are aligned to nest with respect to each other in a nesting arrangement when the third surface 205 is placed in abutting relationship with the first surface 105.

The first light portion 101 has a light path completely separated from a light path of the second light portion 102 with respect to the first light-path changing portion 110 of the first optical member 100 and the second light-path changing portion 120 of the second optical member 200 coupled to the first light-path changing portion 110.

Particularly, the first optical member 100 has a first refractive index against the first light portion 101 of the light 103 and a second refractive index against the second light portion 102 of the light 103, and the second optical member 200 has only the first refractive index against the first and second light portions 101 and 102 of the light 103. Thus, the first light portion 101 of the light 103 may pass through the first and second light-path changing portions 110 and 120 between the first and second optical members 100 and 200 without refraction and/or reflection.

On the contrary, the second light portion 102 of the light 103 incident into the first optical member 100 is refracted or reflected from a boundary between the first and second optical members 100 and 200 because the first optical member 100 has the second refractive index against the second light portion 102 of the light 103, while the second optical member 200 has only the first refractive index against the first and second light portions 101 and 102.

Figure 5:
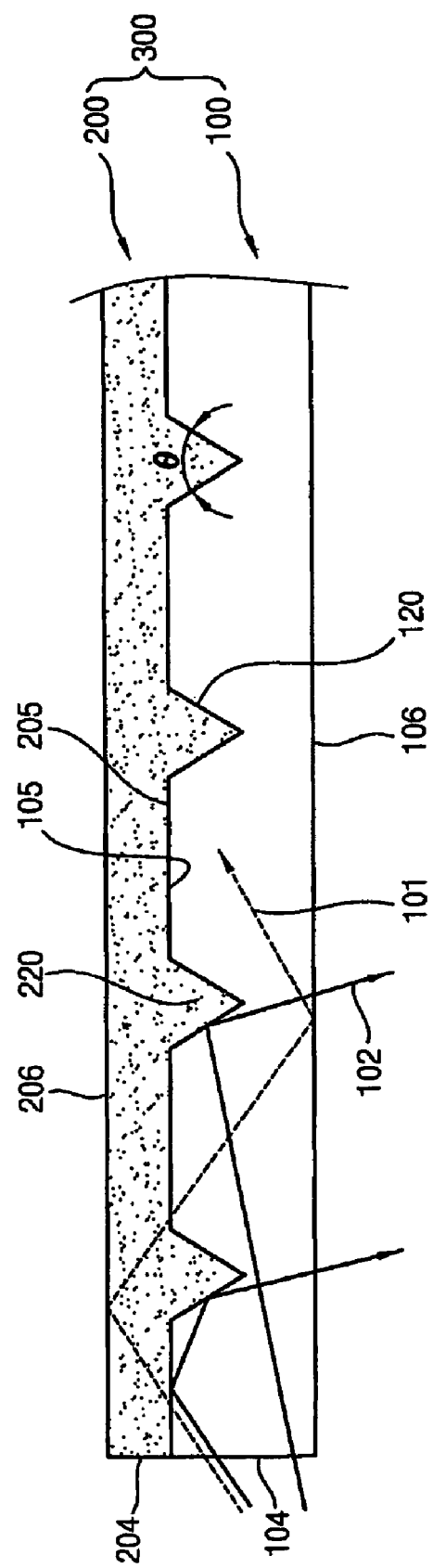
FIG. 5 is a cross-sectional view showing another exemplary embodiment of a light guide plate according to the present invention.

FIG. 5 is a cross-sectional view showing another exemplary embodiment of a light guide plate according to the present invention. In FIG. 5, the light guide plate has a same function and a same structure as the light guide plate in FIGS. 3 and 4 except for a first light-path changing portion and a second light-path changing portion, and thus any further repetitive descriptions of the light guide plate will be omitted.

Referring to FIG. 5, a first optical member 100 of the light guide plate 300 includes a first light path-changing portion 120 and a second optical member 200 includes a second light path-changing portion 220.

The first light path-changing portion 120 is formed at a first surface 105 of the first optical member 100 facing the third surface 205 of the second optical member 200. The second light path-changing portion 220 is formed at a third surface 205 of the second optical member 200 facing the first surface 105.

In the illustrated embodiment, the first light-path-changing portion 120 has a recessed shape, and the second light path-changing portion 220 as a projected shape. That is, the first light-path changing portion 120 includes a groove formed at the first surface 105. The first light-path-changing portion 120 has a V shape in a cross-sectional view, and an internal angle of the first light-path-changing portion 120 is from about 20 degrees to about 60 degrees, preferably, about 40 degrees. The second light path-changing portion 220 has a complimentary V-shaped projection in cross-sectional view that is shaped to matingly engage with the first light path-changing portion 120. There may be a plurality of portions 120, and 220 dispersed across the surfaces 105, 205, respectively. Also, although the portions 120, 220 are illustrated as having the same shape across the surfaces 105, 205 from a first side face 104, 204 to an opposite side face, it should be understood that the size of the shapes 120, 220 may vary.

The first light portion 101 of the light 103 may pass through a boundary between the first and second optical members 100 and 200 without refraction and/or reflection since the first optical member 100 has a first refractive index against the first light portion 101 of the light 103 and the second optical member 200 has the first refractive index against the first and second light portions 101 and 102 of the light 103.

On the contrary, the first optical member 100 has a second refractive index against the second light portion 102 of the light 103, and the second optical member 200 has the first refractive index against the second light portion 102. Thus, the second light portion 102 of the light 103 is refracted or reflected from the boundary between the first and second optical members 100 and 200, where the boundary is defined by the engagement between the first surface 105 of the first optical member 100 and the third surface 205 of the second optical member 200.

The second light portion 102 of the light 103 incident into the light guide plate 300 is reflected from the boundary between the first and second optical members 100, 200 such that the reflected second light portion 102 is substantially vertically incident into the second surface 106 of the first optical member 100. Thus, the second light portion 102 may pass through the second surface 106.

Figure 6:
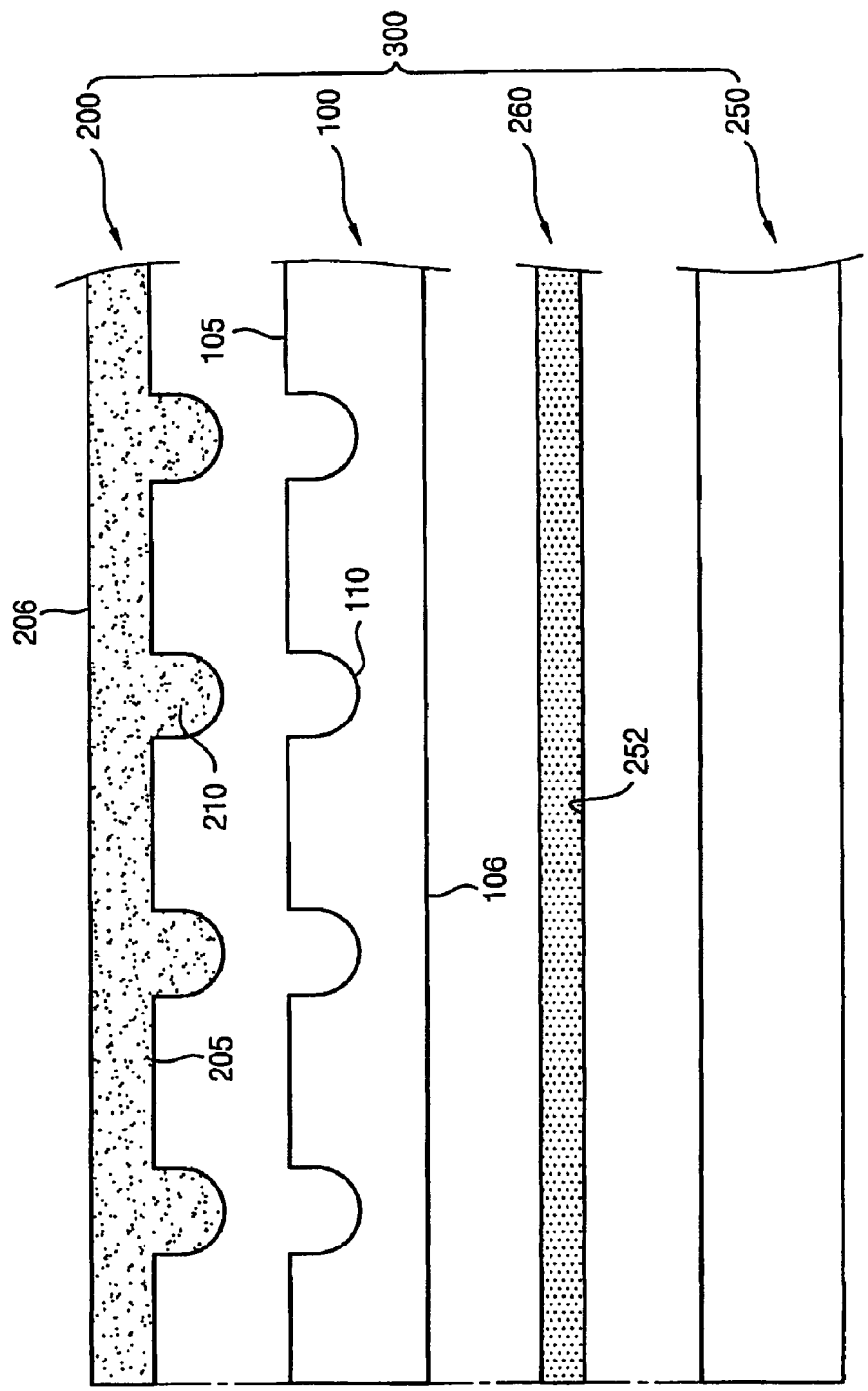
FIG. 6 is an exploded cross-sectional view showing another exemplary embodiment of a light guide plate according to the present invention.

FIG. 6 is an exploded cross-sectional view showing another exemplary embodiment of a light guide plate according to the present invention. In FIG. 6, the light guide plate has a same function and a same structure as the light guide plate in FIGS. 3 and 4 except for a base body and an adhesive member, and thus any further repetitive descriptions of the light guide plate will be omitted.

Referring to FIG. 6, a light guide plate 300 includes a first optical member 100, a second optical member 200, a base body 250, and an adhesive member 260. In order to reinforce strength and improve optical properties of the light guide plate 300, the base film or body 250 is formed on the first optical member 100.

In the illustrated embodiment, the base body 250 has a substantially same rectangular plate-like shape as the first optical member 100, and the base body 250 supports the first optical member 100 and the second optical member 200. If the first and second optical members 100, 200 have a shape other than the illustrated rectangular plate-like shape, then the base body 250 may likewise have a shape complimentary with the shape of the first and second optical members 100, 200.

The base body 250 may include polymethylmethacrylate and a first refractive index with respect to the first and second light portions 101 and 102 of the light 103. For example, the first optical member 100 has the first refractive index of about 1.57 against the first light portion 101 of the light 103, and the base body 250 has a refractive index of about 1.49.

In order to adhere the first optical member 100 to the base body 250, the adhesive member 260 is disposed between the second surface 106 of the first optical member 100 and the base body 250. Examples of the adhesive member 260 may include an adhesive material and a light curable material.

The adhesive member 260 adheres the base body 250 to the first optical member 100 by securing a surface 252 of the adhesive member 260 to the base body 250. In the present embodiment, the adhesive member 260 has a refractive index with respect to the first and second light portions 101 and 102 of the light 103. The adhesive member 260 has the refractive index of about 1.55 against the first light portion 101 of the light 103, and thus the refractive index of the adhesive member 260 is substantially equal to the first refractive index of the first optical member 100.

When the light 103 having the first and second light portions 101 and 102 sequentially passes through the base body 250, the adhesive member 260, the first optical member 100 and the second optical member 200 of the light guide plate 300, such as in a direct illumination type backlight assembly, the first light portion 101 sequentially passes through the base body 250, the adhesive member 260, the first optical member 100 and the second optical member 200 and exits the fourth face 206 of the optical member 100.

However, the second light portion 102 of the light 103 is reflected from a boundary between the first and second optical members 100 and 200, such as defined by the first and third surfaces 105, 205, and then the reflected second light portion 102 sequentially passes through the adhesive member 260 and the base body 250.

The second light portion 102, after passing through the base body 250, is converted into the first light portion 101 outside the light guide plate 300, such as by reflecting the second light portion 102 by a reflecting member positioned adjacent the base body 250.

Figure 7:
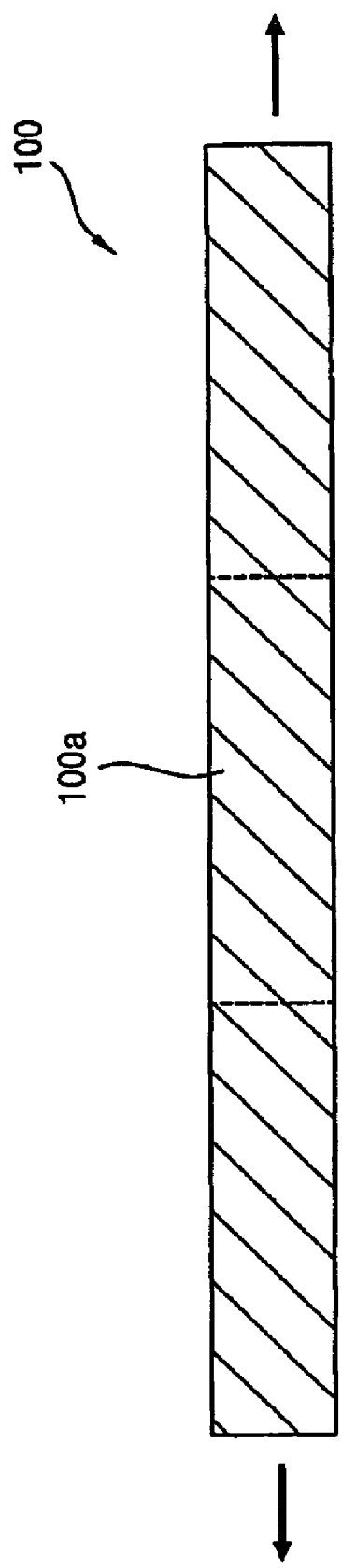
FIGS. 7 and 8 are cross-sectional views showing an exemplary embodiment of a first optical member and a second optical member for a light guide plate according to the present invention.
Figure 8:
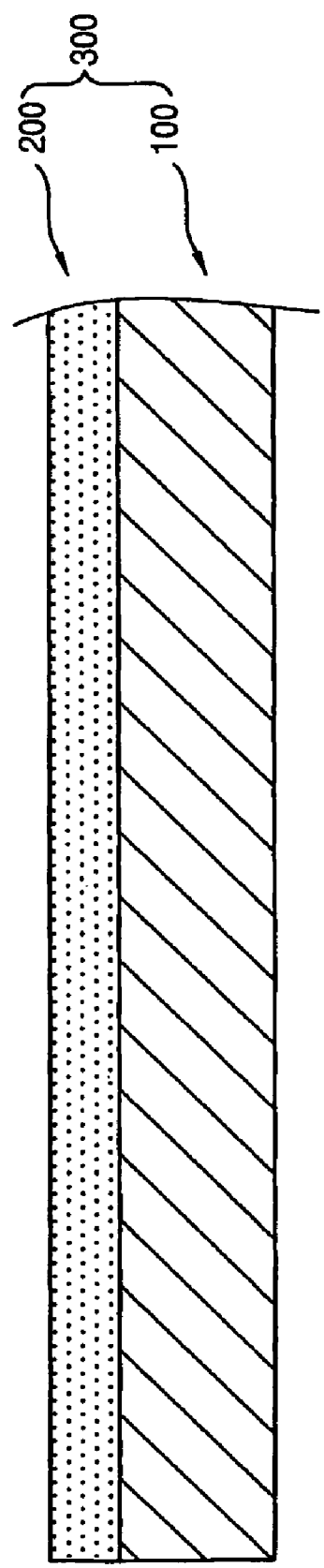

FIGS. 7 and 8 are cross-sectional views showing an exemplary embodiment of a first optical member and a second optical member for a light guide plate according to the present invention.

Referring to FIGS. 7 and 8, a first optical member 100 is formed for the light guide plate.

In order to form the first optical member 100, a polyethylenenaphthalate resin is injection-molded to form a film body 100a having a thickness of about 400 micrometers. In the present embodiment, the film body 100a may include a diffusing agent, such as calcium carbonate (CaCO3), magnesiumsilicate hydroxide (Talc), etc., of about 5%. Although described as having a thickness of about 400 micrometers, the film body 100a may alternatively have a thickness in the range of about 350 micrometers to about 450 micrometers. The film body 100a is heated at about 130 degrees Celsius, and the heated film body 100a is mechanically expanded in a predetermined direction. The film body 100a has an expansion ratio depending on the expanded length thereof, and the expansion ratio is from about 200% to about 700% with respect to an initial length of the film body 100a. For example, when the expansion ratio is 200%, then the length of the film body 100a is two times the initial length of the film body 100a.

In the present embodiment, the film body 100a is expanded under a temperature of 130 degrees Celsius until the film body 100a is expanded by about 500% with respect to an initial size thereof, to thereby form the first optical member 100. The expanded first optical member 100 has a different refractive index against the first and second light portions 101 and 102 of the light incident into the first optical member 100, whether in an edge type backlight assembly or in a direct type backlight assembly. That is, the first optical member 100 has the first refractive index and the second refractive index with respect to the first and second light portions 101 and 102, respectively. In the present embodiment, the first refractive index is about 1.57 and the second refractive index is about 1.85.

Referring to FIG. 8, the second optical member 200 is formed on the first optical member 100 to form the light guide plate 300. The second optical member 200 includes a transparent material and has a same or substantially same refractive index as the first refractive index of the first optical member 100 with respect to the first and second light portions 101 and 102 of the light 103. That is, when the first optical member 100 has the first refractive index of about 1.57 against the first light portion 101 of the light 103, then the second optical member 200 has the refractive index of about 1.57 against the first and second light portions 101 and 102.

The second optical member 200 includes a photocrosslinkable polymer solution having an initiator, a photopolymerizable monomer or an oligomer. When the second optical member 200 is exposed to an ultraviolet light, a permanent adhesive layer may be formed between the first and second optical members 100 and 200, and a light refractive index and a light transmittance of the light may be selectively adjusted. Thus, an acryl-based ultraviolet light curable resin may include the photopolymerizable monomer such as acrylate-based, epoxy acrylate-based, polyester acrylate-based, urethane acrylate-based, etc., the photopolymerizable initiator such as acetophenone-based, benzophenone-based, thioxanthone-based, etc., and the oligomer of about 0.01 to about 2 weight percent against a curable resin.

Thus, when the light having the first and second light portions 101 and 102 is incident into the light guide plate 300, the first light portion 101 of the light 103 passes through a boundary between the first and second optical members 100 and 200 of the light guide plate 300, and the second light portion 102 of the light 103 is reflected from the boundary between the first and second optical members 100 and 200, where the boundary is formed by an interface of the first surface 105 of the first optical member 100 and a third surface 205 of the second optical member 200. That is, the first and second light portions 101 and 102 are separated from each other at the boundary between the first and second optical members 100 and 200.

In order to enhance an angle between the path of the first light portion 101 and the path of the second light portion 102, recesses, grooves or concavo-convexes may be formed at the boundary between the first and second optical members 100 and 200, such as in, but not limited to, the illustrated embodiments shown in FIGS. 3-6.

Figure 9:
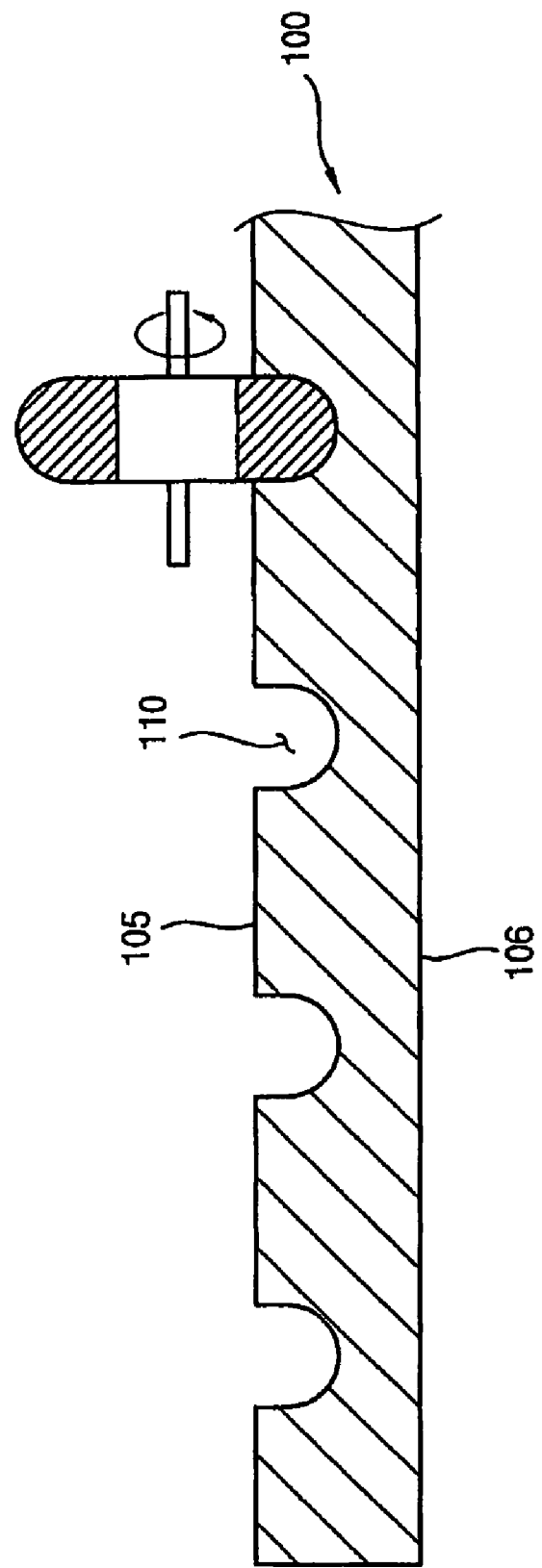
FIG. 9 is a cross-sectional view showing another exemplary embodiment of a first optical member having a light path-changing portion according to the present invention.
Figure 10:
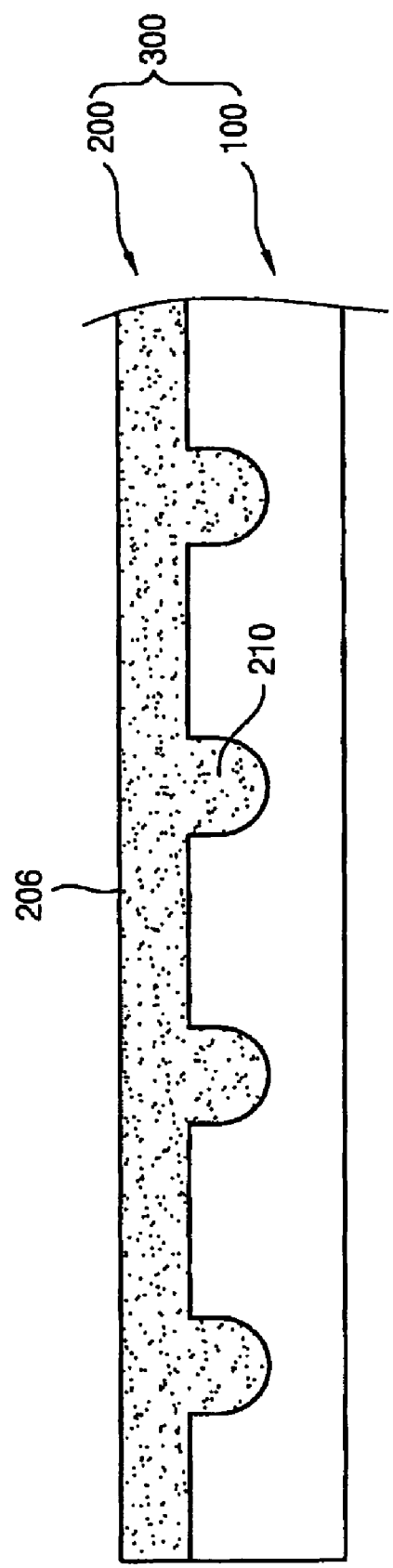
FIG. 10 is a cross-sectional view showing an exemplary second optical member coupled to the first optical member in FIG. 9.

FIG. 9 is a cross-sectional view showing another exemplary embodiment of a first optical member having a light path-changing portion according to the present invention. FIG. 10 is a cross-sectional view showing an exemplary second optical member coupled to the first optical member in FIG. 9. In FIGS. 9 and 10, the same reference numerals denote the same elements in FIGS. 3 and 4, and thus the detailed descriptions of the same elements will be omitted.

Referring to FIGS. 9 and 10, a first light path-changing portion 110 is formed on the first optical member 100 having an expansion ratio of about 500%. The first light path-changing portion 110 formed on the first optical member 100 may have a recess or a groove. In particular, the first light path-changing portion 110 formed on the first optical member 100 may have the recess having a cross-sectional profile of a semicircular shape or the groove having a cross-sectional profile of the semicircular shape.

When the first light path-changing portion 110 formed on the first optical member 100 has the semicircular-shaped groove, the first light path-changing portion 110 may be formed using a cutting machine and a milling machine employing a semicircular-shaped diamond. In the present embodiment, the semicircular-shaped recess has a width of about 300 micrometers.

TABLE 1

| | Liquid crystal display apparatus 1 | Liquid crystal display apparatus 2 |
| --- | --- | --- |
| Brightness 1 (13 points) | 330 nit | 329 nit |
| Brightness 2 (4 points) | 334 nit | 334 nit |
| Brightness uniformity | 73.1% | 73.1% |
| Brightness efficiency | 100% | 99.8% |

As shown in Table 1, the liquid crystal display apparatus 1 and the liquid crystal display apparatus 2 indicate a conventional liquid crystal display apparatus and the liquid crystal display apparatus according to one embodiment of the present invention, respectively.

The brightness, the brightness uniformity, and the brightness efficiency have been measured using the liquid crystal display apparatus 1 employing a liquid crystal display panel of 17 inches, a dual brightness enhancement film, a prism film, a diffusion sheet, a light guide plate and a lamp.

The brightness, the brightness uniformity and the brightness efficiency of the liquid crystal display apparatus 2 of the present invention have been measured using a display apparatus employing a light guide plate at which the first and second optical members are formed, a liquid crystal display panel of 17 inches and a lamp.

In accordance with the measured result, the brightness, the brightness uniformity, and the brightness efficiency in the liquid crystal display apparatus 1 are substantially the same as the brightness, the brightness uniformity, and the brightness efficiency in the liquid crystal display apparatus 2. Thus, although the prism sheet, the dual brightness enhancement film and the diffusion sheet are not employed in the liquid crystal display apparatus 2, the liquid crystal display apparatus 2 may display a high quality image when the light guide plate according to the present embodiments is employed in the liquid crystal display apparatus.

The second optical member 200 is coupled to the first optical member 100 on which the first light path-changing portion 110 is formed such that the first light path-changing portion 110 is covered by the second light path-changing portion 210.

Figure 11:
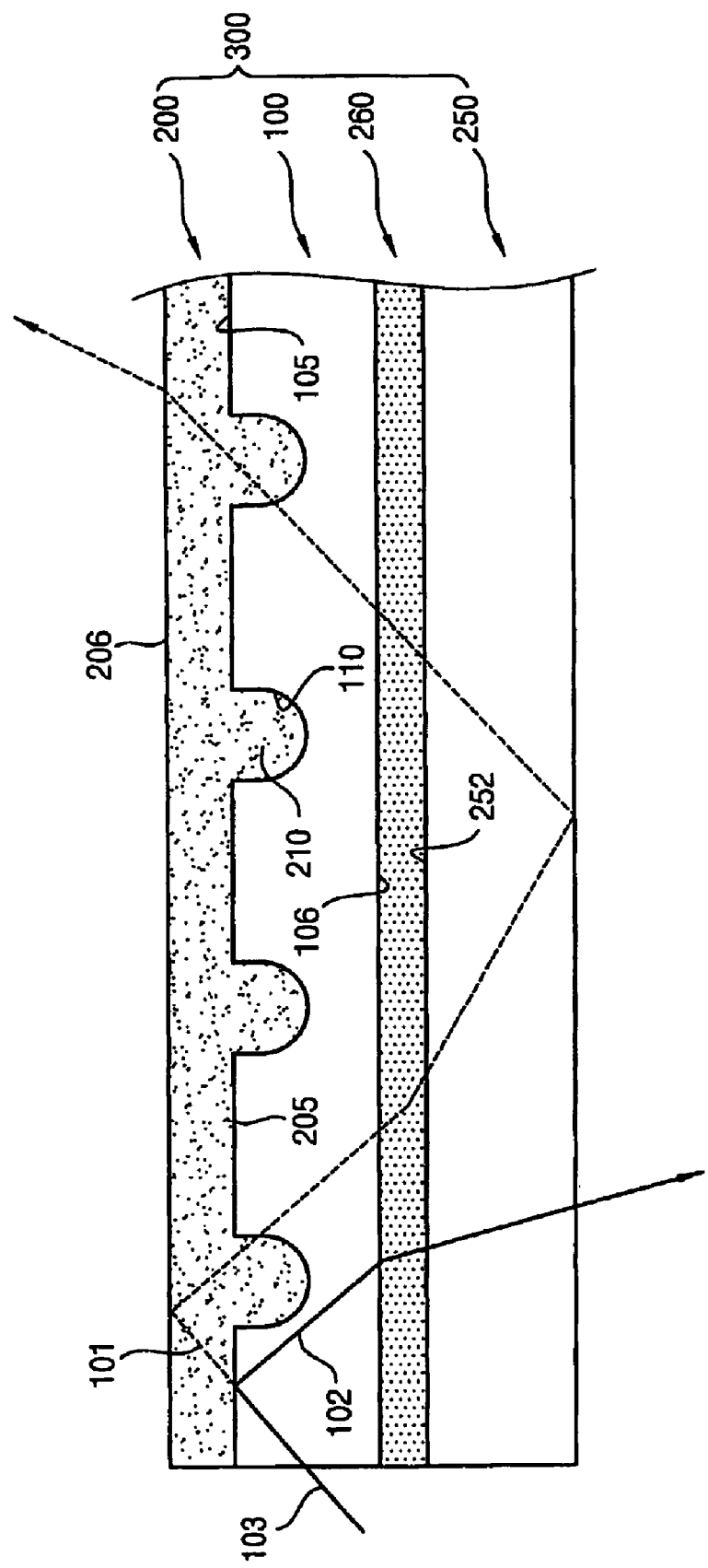
FIG. 11 is a cross-sectional view showing an exemplary base film coupled to the first optical member in FIG. 10.

FIG. 11 is a cross-sectional view showing a base film or body coupled to the first optical member in FIG. 10.

Referring to FIG. 11, in order to reinforce strength and improve optical properties of the light guide plate 300, a base film or body 250 is formed on the first optical member 100. The base body 250 is adhered to the first optical member 100 by an adhesive member 260 having a light curable material such as an ultraviolet light curable material.

Figure 12:
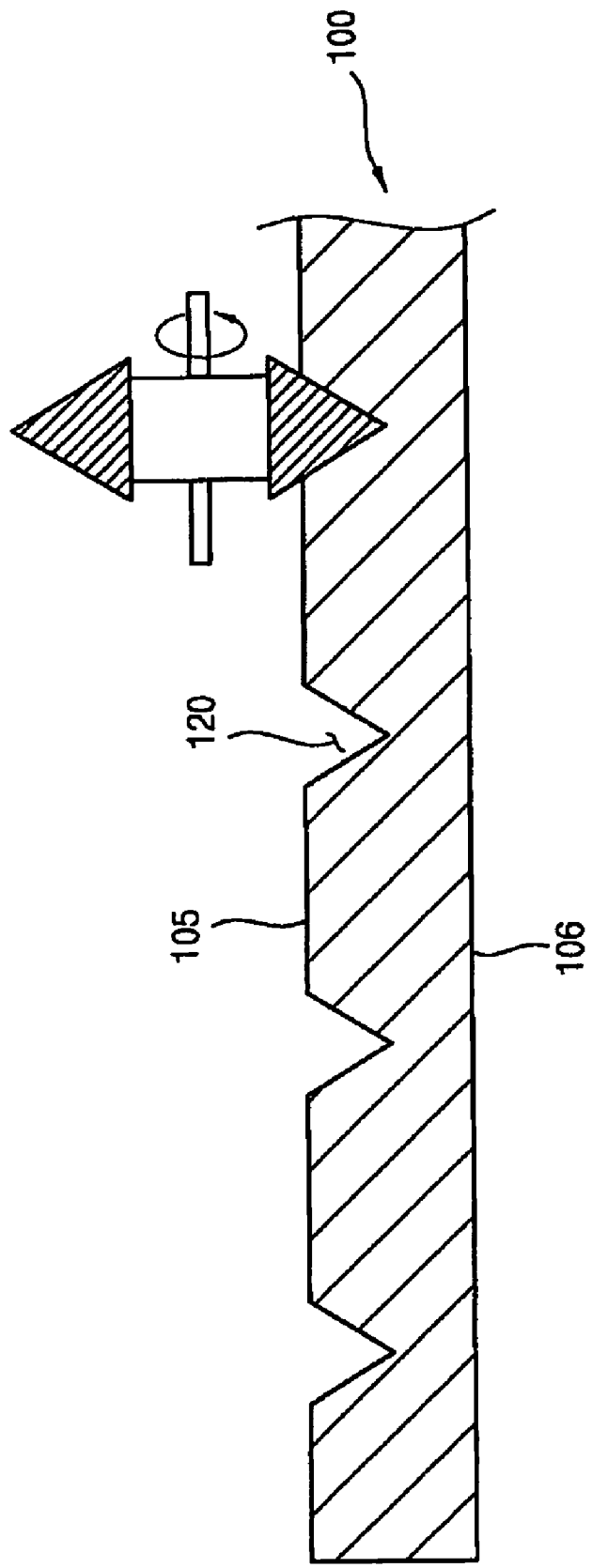
FIG. 12 is a cross-sectional view showing another exemplary embodiment of a light path-changing portion formed on a first optical member according to the present invention.
Figure 13:
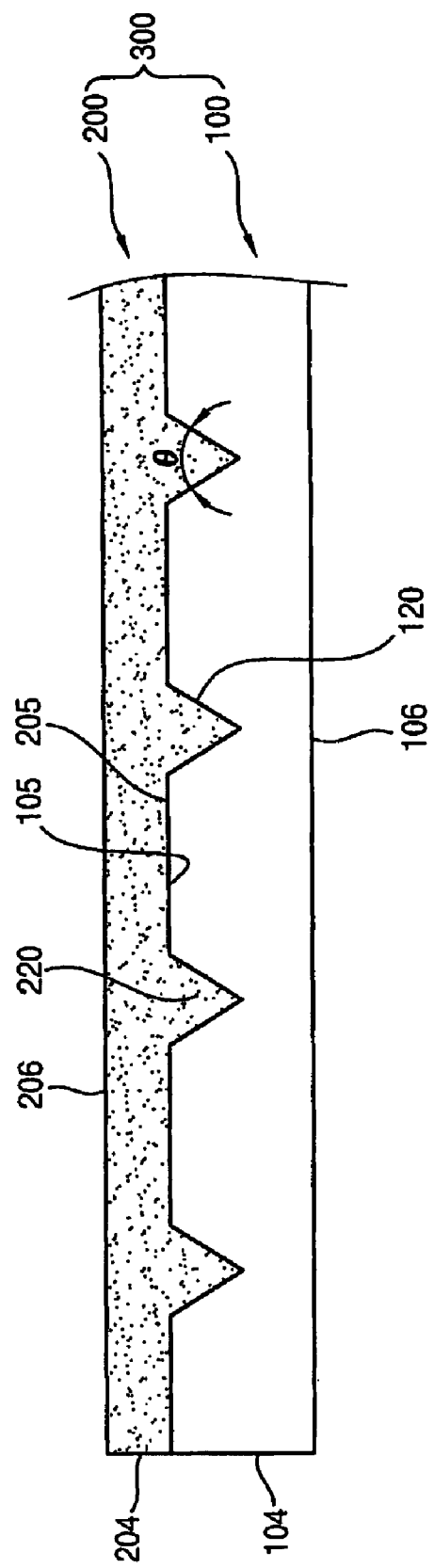
FIG. 13 is a cross-sectional view showing an exemplary second optical member formed on the first optical member in FIG. 12.

FIG. 12 is a cross-sectional view showing another exemplary embodiment of a light path-changing portion formed on a first optical member according to the present invention. FIG. 13 is a cross-sectional view showing a second optical member formed on the first optical member in FIG. 12.

Referring to FIGS. 12 and 13, a first light path-changing portion 120 is formed on the first optical member 100. The first light path-changing portion 120 formed on the first optical member 100 may have a recess or a groove. In particular, the first light path-changing portion 120 formed on the first optical member 100 may have the recess having a V-shaped cross-sectional profile or the groove having a V-shaped cross-sectional profile.

When the first light path-changing portion 120 formed on the first optical member 100 has the V-shaped groove, the first light path-changing portion 120 may be formed using a cutting machine and a milling machine employing a V-shaped diamond. In the present embodiment, the V-shaped recess of the first light path-changing portion 120 has a width of about 300 micrometers.

TABLE 2

|  | Liquid crystal display apparatus 1 | Liquid crystal display apparatus 2 |
| --- | --- | --- |
| Brightness 1(13 points) | 331 nit | 330 nit |
| Brightness 2(5 points) | 336 nit | 332 nit |
| Brightness uniformity | 73.1% | 73.1% |
| Brightness efficiency (13 points) | 100% | 99.8% |

As shown in Table 2, the liquid crystal display apparatus 1 and the liquid crystal display apparatus 2 indicate a conventional liquid crystal display apparatus and the liquid crystal display apparatus according to one embodiment of the present invention, respectively.

The brightness, the brightness uniformity, and the brightness efficiency of the liquid crystal display apparatus 1 have been measured using a liquid crystal display apparatus employing a liquid crystal display panel of 17 inches, a dual brightness enhancement film, a prism film, a diffusion sheet, a light guide plate, and a lamp.

The brightness, the brightness uniformity, and the brightness efficiency of the liquid crystal display apparatus 2 of the present invention have been measured using a liquid crystal display apparatus employing a light guide plate at which the first and second optical members are formed, a liquid crystal display panel of 17 inches, and a lamp.

In accordance with the measured result, the brightness, the brightness uniformity, and the brightness efficiency in the liquid crystal display apparatus 1 are substantially the same as the brightness, the brightness uniformity, and the brightness efficiency in the liquid crystal display apparatus 2. Thus, although the prism sheet, the dual brightness enhancement film, and the diffusion sheet are not employed in the liquid crystal display apparatus 2, the liquid crystal display apparatus 2 may display a high quality image when the light guide plate according to the present embodiments is employed in the liquid crystal display apparatus.

Figure 14:
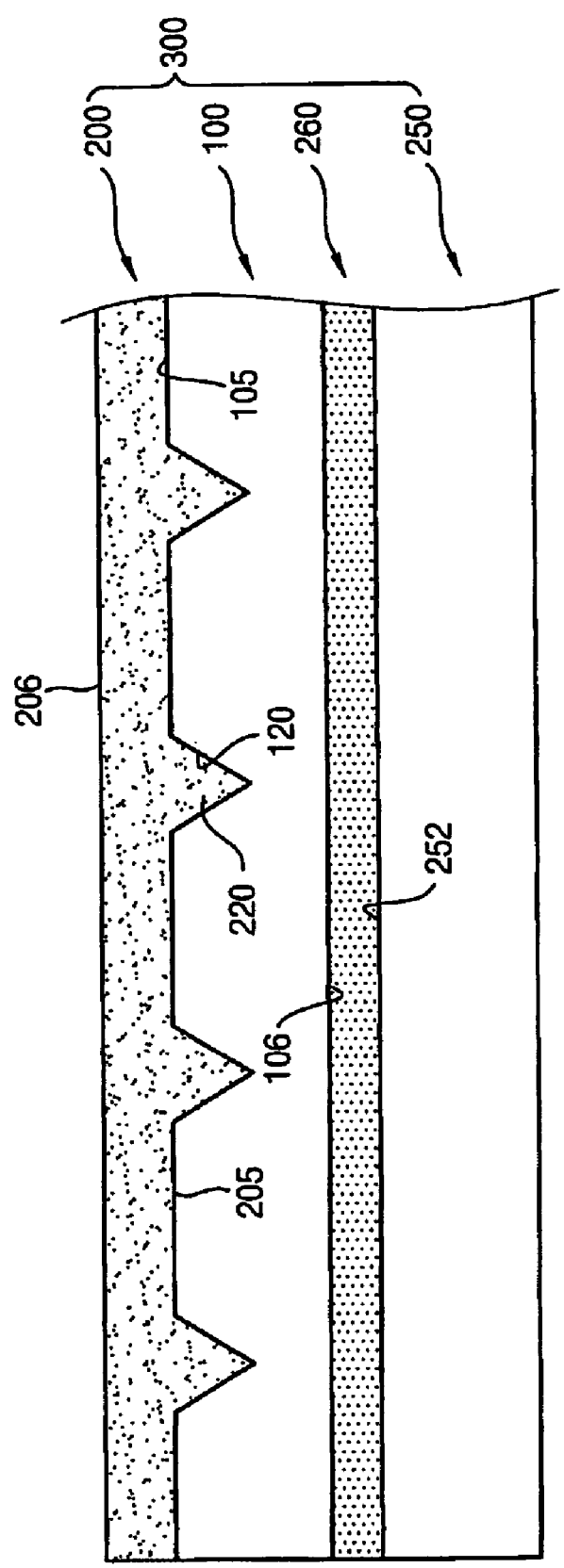
FIG. 14 is a cross-sectional view showing an exemplary base film coupled to the first optical member in FIG. 13.

FIG. 14 is a cross-sectional view showing a base body coupled to the first optical member in FIG. 13.

Referring to FIG. 14, in order to reinforce strength and improve optical properties of the light guide plate 300, a base film or body 250 is formed on the first optical member 100. The base body 250 is adhered to the first optical member 100 by an adhesive member 260 having a light curable material such as an ultraviolet light curable material.

Figure 15:
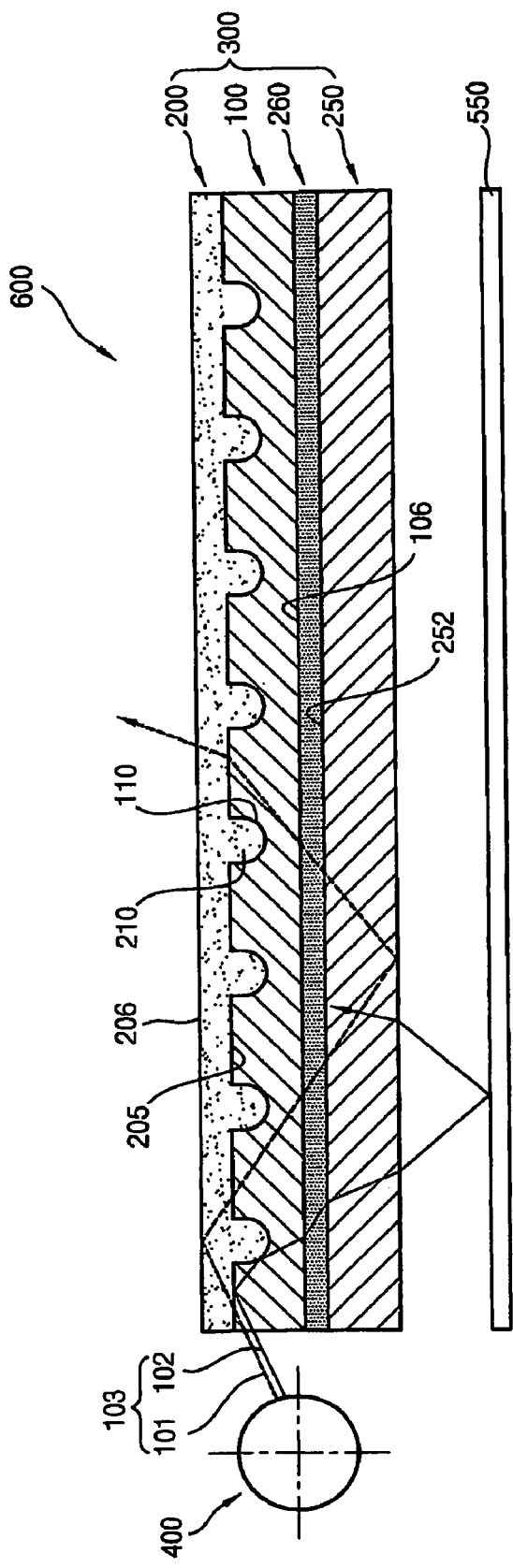
FIG. 15 is a cross-sectional view showing an exemplary embodiment of a backlight assembly according to the present invention.

FIG. 15 is a cross-sectional view showing an exemplary embodiment of a backlight assembly according to the present invention.

Referring to FIG. 15, a backlight assembly 600 includes a light guide plate 300, a light source 400, and a reflecting plate 550.

The light source 400 of the backlight assembly 600 emits a light 103 used to display an image. The light source 400 may include a point light source such as a light emitting diode ("LED"), or a surface light source such as a cold cathode fluorescent lamp ("CCFL"). Also, while illustrated in an edge-type illumination backlight assembly, the light source 400 may also be arranged between the base body 250 and the reflecting plate 550 to form a direct-type illumination backlight assembly.

The light 103 emitted from the light source 400 may include a first light portion 101 such as a primary wave and a second light portion 102 such as a secondary wave.

The light guide plate 300 includes a first optical member 100 having a first light path-changing portion 110, a second optical member 200 having a second light path-changing portion 210, a base body 250, and an adhesive member 260.

The first optical member 100 has a first refractive index against the first light portion 101 of the light 103 emitted from the light source 400 and a second refractive index against the second light portion 102 of the light 103 emitted from the light source 400.

The second optical member 200 has the first refractive index against the first and second light portions 101 and 102 of the light 103 emitted from the light source 400.

Thus, the first light portion 101 of the light 103 passes through a boundary between the first and second optical members 100 and 200, and the second light portion 102 is refracted at or reflected from the boundary between the first and second optical members 100 and 200, where the boundary is defined by the abutment of the first surface 105 against the third surface 205.

The base body 250 has a substantially same rectangular plate shape, or other complimentary shape, as the first optical member 100, and the base body 250 supports the first optical member 100 and the second optical member 200.

The base body 250 may include the polymethylmethacrylate, and the base body 250 has a substantially same refractive index as the first refractive index. That is, when the first refractive index of the first optical member 100 is about 1.57, the refractive index of the base body 250 is about 1.49 and is thus substantially the same as the first refractive index.

In order to adhere the base body 250 to the first optical member 100, the adhesive member 260 is formed between the base body 250 and the first optical member 100. The adhesive member 260 may include an adhesive material that adheres the base body 250 to the first optical member 100 and a light curable material such as an ultraviolet light curable resin.

The adhesive member 260 that adheres the base body 250 to the first optical member 100 has the first refractive index.

When the light 103 having the first and second light portions 101 and 102 is incident into the light guide plate 300 having the base body 250, the adhesive member 260, the first optical member 100 and the second optical member 200, the first light portion 101 sequentially passes through boundaries between the base body 250, the adhesive member 260, the first optical member 100 and the second optical member 200, and is emitted through the fourth face 206 of the second optical member 200. The second light portion 102 is reflected from the boundary between the first and second optical members 100 and 200 and passes through the adhesive member 260 and the base body 250.

The second light portion 102 of the light 103 is converted into the first light portion 101 after exiting the light guide plate 300.

The reflecting plate 550 reflects the first light portion 101 of the light 103 from the base body 250, so that the first light portion 101 is incident into the light guide plate 300.

The reflecting plate 550 reflects the second light portion 102 of the light 103 from the base body 250 of the light guide plate 300 such that the second light portion 102 is converted into the first light portion 101. The converted second light portion 102 is incident into the light guide plate 300 as the first light portion 101.

Figure 16:
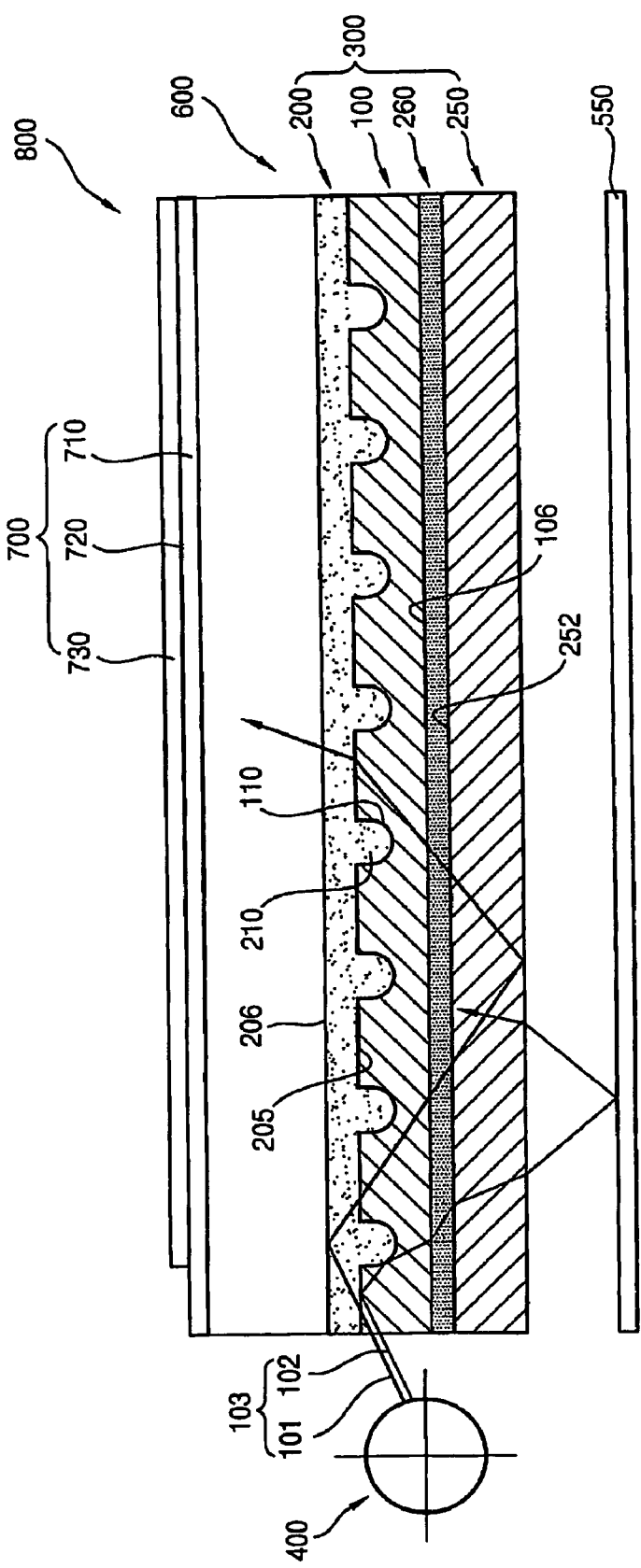
FIG. 16 is a cross-sectional view showing an exemplary embodiment of a display apparatus according to the present invention.

FIG. 16 is a cross-sectional view showing an exemplary embodiment of a display apparatus according to the present invention.

Referring to FIG. 16, a display apparatus 800 includes a backlight assembly 600 and a display panel 700.

The backlight assembly 600 includes a light guide plate 300, a light source 400, and a reflecting plate 550.

The light source 400 of the backlight assembly 600 emits a light 103 used to display an image. The light source 400 may include a point light source such as an LED, or a surface light source such as a CCFL. While illustrated as an edge-type illumination backlight assembly 600, the backlight assembly 600 may alternatively include a light source 400 positioned between the base body 250 and the reflecting plate 550 to form a direct-type illumination backlight assembly.

The light 103 emitted from the light source 400 may include a first light portion 101 such as a primary wave and a second light portion 102 such as a secondary wave.

The light guide plate 300 includes a first optical member 100 having a first light path-changing portion 110, a second optical member 200 having a second light path-changing portion 210, a base body 250, and an adhesive member 260.

The first optical member 100 has a first refractive index against the first light portion 101 of the light 103 emitted from the light source 400 and a second refractive index against the second light portion 102 of the light 103 emitted from the light source 400.

The second optical member 200 has the first refractive index against the first and second light portions 101 and 102 of the light 103 emitted from the light source 400.

Thus, the first light portion 101 of the light 103 passes through a boundary between the first and second optical members 100 and 200, and the second light portion 102 is refracted at or reflected from the boundary between the first and second optical members 100 and 200, where the boundary is formed by the abutment of the first surface 105, including its first path-changing portions 110, against the third surface 205, including its second path-changing portions 210.

The base body 250 has a substantially same rectangular plate shape or other complimentary shape as the first optical member 100, and the base body 250 supports the first optical member 100 and the second optical member 200.

The base body 250 may include polymethylmethacrylate, and the base body 250 has a substantially same refractive index as the first refractive index. That is, when the first refractive index of the first optical member 100 is about 1.57, the refractive index of the base body 250 may be about 1.49 and is thus substantially same as the first refractive index.

In order to adhere the base body 250 to the first optical member 100, the adhesive member 260 is formed between the base body 250 and the first optical member 100. The adhesive member 260 may include an adhesive material that adheres the base body 250 to the first optical member 100 and a light curable material such as an ultraviolet light curable resin.

The adhesive member 260 that adheres the base body 250 to the first optical member 100 has the first refractive index.

When the light 103 having the first and second light portions 101 and 102 is incident into the light guide plate 300 having the base body 250, the adhesive member 260, the first optical member 100 and the second optical member 200, the first light portion 101 sequentially passes through boundaries between the base body 250, the adhesive member 260, the first optical member 100 and the second optical member 200, and is emitted through the fourth face 206 of the second optical member 200. The second light portion 102 is reflected from the boundary between the first and second optical members 100 and 200 and passes through the adhesive member 260 and the base body 250.

The second light portion 102 of the light 103 is converted into the first light portion 101 after exiting the light guide plate 300.

The reflecting plate 550 reflects the first light portion 101 of the light 103 from the base body 250, so that the first light portion 101 is incident into the light guide plate 300.

The reflecting plate 550 reflects the second light portion 102 of the light 103 from the base body 250 of the light guide plate 300 such that the second light portion 102 is converted into the first light portion 101. The converted second light portion 102 is incident into the light guide plate 300 as the first light portion 101.

Thus, only the first light portion 101 of the light 103 is emitted from the light guide plate 300, and the first light portion 101 from the light guide plate 300 is applied to the display panel 700 facing the fourth surface 206 of the second optical member 200 of the light guide plate 300.

The display panel 700 includes a thin film transistor ("TFT") substrate 710, a liquid crystal layer 720, and a color filter substrate 730.

The TFT substrate 710 faces the color filter substrate 730, and the liquid crystal layer 720 is disposed between the thin film transistor substrate 710 and the color filter substrate 730.

The TFT substrate 710 includes a plurality of pixel areas arranged in a matrix configuration, and pixel electrodes are formed in the pixel areas, respectively. Each of the pixel electrodes is electrically connected to a TFT.

The color filter substrate 730 facing the TFT substrate 710 includes color filters facing the pixel areas, respectively, and a common electrode facing the pixel electrode is formed on the color filters.

According to the above, the light leaking from the light guide plate is reflected toward the display panel, so that an amount of the light applied to the display panel from the light guide plate may be enhanced. Thus, the brightness and the brightness uniformity of the image displayed on the display panel may be improved, and a number of parts of the display apparatus may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A light guide plate comprising:
   a first optical member having a first refractive index against a first light portion of a light and a second refractive index against a second light portion of the light, the first optical member having a first light path-changing portion; and
   a second optical member having the first refractive index against the first and second light portions, the second optical member formed on the first optical member, the second optical member having a second light path-changing portion corresponding to the first light path-changing portion and protruded towards the first optical member;
   wherein the first light portion of the light is not refracted or reflected from a boundary between the first and second optical members, and the second portion of the light is refracted or reflected from the boundary between the first and second optical members by a difference between the first refractive index and the second refractive index.

2. The light guide plate of claim 1, wherein the second refractive index is different than the first refractive index.

3. The light guide plate of claim 1, wherein the first light path-changing portion separates the first and second light portions of the light.

4. The light guide plate of claim 3, further comprising a plurality of the first light path-changing portions on a surface of the first optical member and a plurality of the second light path-changing portions on a surface of the second optical member.

5. The light guide plate of claim 4, wherein the first light path-changing portions are arranged in a dimpled pattern across the surface of the first optical member.

6. The light guide plate of claim 3, wherein the first light path-changing portion has a length substantially same as a length of the first optical member.

7. The light guide plate of claim 3, wherein the second light path-changing portion nests with the first light path-changing portion, and wherein a surface of the first optical member having the first light path-changing portion lies flush with a surface of the second optical member having the second light path-changing portion.

8. The light guide plate of claim 3, wherein the first light path-changing portion has a recess, and the second light path-changing portion has a projection corresponding to the recess.

9. The light guide plate of claim 8, wherein an inner portion of the first light path-changing portion is partially curved.

10. The light guide plate of claim 8, wherein the first light path-changing portion has a V shape, and an internal angle of the V shape is from about 20 degrees to about 50 degrees.

11. The light guide plate of claim 8, wherein the first light path-changing portion has a cone-shaped recess, and the second light path-changing portion has a cone shape coupled to the cone-shaped recess.

12. The light guide plate of claim 1, wherein the first optical member further comprises a base film.

13. The light guide plate of claim 12, wherein a refractive index of the base film is substantially the same as the first refractive index of the first optical member against the first light portion of the light.

14. The light guide plate of claim 12, wherein the base film comprises polymethylmethacrylate.

15. The light guide plate of claim 12, wherein the first optical member is adhered to the base film by an adhesive member.

16. The light guide plate of claim 15, wherein the adhesive member further comprises a light curable material that is cured when exposed to light.

17. The light guide plate of claim 16, wherein the adhesive member and the second optical member have a substantially same refractive index.

18. The light guide plate of claim 16, wherein the light for curing the light curable material is an ultraviolet light.

19. The light guide plate of claim 1, wherein the first optical member includes at least one material selected from the group consisting of a polycarbonate-based resin, a polysulfonate-based resin, a polymethylmethacrylate-based resin, a polystyrene-based resin, a polyvinylchloride-based resin, a polyvinylalcohol-based resin, a polynorbornene-based resin and a polyethylenenaphthalate-based resin.

20. The light guide plate of claim 1, wherein the first optical member has an expansion ratio from about 200% to about 700%.

21. The light guide plate of claim 1, wherein the first optical member comprises polyethylene naphthalate, and the first refractive index is about 1.57 and the second refractive index is about 1.85.

22. The light guide plate of claim 1, wherein the first light portion of the light incident in the first optical member is emitted through the second optical member.

23. The light guide plate of claim 1, wherein the first light portion is a primary wave and the second light portion is a secondary wave.

24. A method of manufacturing a light guide plate, the method comprising:
   forming a first optical member having a first refractive index against a first light portion of a light and a second refractive index against a second light portion of the light, the first optical member having a first light path-changing portion; and
   forming a second optical member on the first optical member, the second optical member having the first refractive index against the first and second light portions, the second optical member having a second light path-changing portion corresponding to the first light path-changing portion and protruded toward the first optical member,
   wherein the first light portion of the light is not refracted or reflected from a boundary between the first and second optical members, and the second portion of the light is refracted or reflected from the boundary between the first and second optical members by a difference between the first refractive index and the second refractive index.

25. The method of claim 24, further comprising adhering the first optical member to a base substrate by a light curable adhesive member.

26. The method of claim 24, wherein the first and second light path-changing portions separate the first and second light portions from each other.

27. The method of claim 26, wherein the first light path-changing portion has a recess or a groove.

28. The method of claim 26, further comprising forming the first light path-changing portion using a semicircular-shaped cutting unit.

29. The method of claim 26, further comprising forming the first light path-changing portion using a V-shaped cutting unit.

30. The method of claim 24, wherein forming the first optical member comprises:
   forming a film body; and
   heating the film body to expand the film body in a predetermined direction.

31. The method of claim 30, wherein the film body comprises an expansion ratio from about 200% to about 700%.

32. The method of claim 30, wherein the film body has a thickness from about 380 micrometers to about 400 micrometers after the film body is expanded.

33. The method of claim 30, further comprising forming the film body under a temperature from about 130 degrees Celsius to about 150 degrees Celsius.

34. The method of claim 30, further comprising selecting at least one material for the film body from the group consisting of a polycarbonate-based resin, a polysulfonate-based resin, a polymethylmethacrylate-based resin, a polystylene-based resin, a polyvinylchloride-based resin, a polyvinylalcohol-based resin, a polynorbomene-based resin and a polyethylenenaphthalate-based resin.

35. The method of claim 30, wherein the film body further comprises a diffusing agent.

36. The method of claim 35, wherein the diffusing agent comprises calcium carbonate (CaCO3) and magnesium silicate hydroxide (Talc).

37. A backlight assembly comprising:
   a light source to emit a light including a first light portion and a second light portion;
   a light guide plate comprising:
      a first optical member including a first light path-changing portion separating the first and second light portions of the light, the first optical member having a first refractive index against the first light portion of the light and a second refractive index against the second light portion of the light; and
      a second optical member including a second light path-changing portion corresponding to the first light path-changing portion and protruded toward the first optical member, the second optical member having the first refractive index against the first and second light portions, the second optical member formed on the first optical member; and
   a light converting member converting the second light portion of the light from the light guide plate into the first light portion,
   wherein the first light portion of the light is not refracted or reflected from a boundary between the first and second optical members, and the second portion of the light is refracted or reflected from the boundary between the first and second optical members by a difference between the first refractive index and the second refractive index.

38. The backlight assembly of claim 37, wherein the first optical member further comprises a base film adhered to the first optical member by an adhesive member.

39. The backlight assembly of claim 37, wherein the light converting member includes a reflecting plate.

40. A display apparatus comprising:
   a light source to emit a light including a first light portion and a second light portion;
   a light guide plate comprising:
      a first optical member including a first light path-changing portion separating the first and second light portions of the light, the first optical member having a first refractive index against the first light portion of the light and a second refractive index against the second light portion of the light; and
      a second optical member including a second light path-changing portion coresponding to the first light path-changing portion and protruded toward the first optical member, the second optical member having the first refractive index against the first and second light portions, the second optical member formed on the first optical member,
   a light converting member to convert the second light portion of the light from the light guide plate into the first light portion; and
   a display panel to display an image using the first light portion of the light,
   wherein the first light portion of the light is not refracted or reflected from a boundary between the first and second optical members, and the second portion of the light is refracted or reflected from the boundary between the first and second optical members by a difference between the first refractive index and the second refractive index.

41. The display apparatus of claim 40, wherein the first optical member further comprises a base film adhered to the first optical member by an adhesive member.

* * * * *